United States Patent [19]

Menting et al.

[11] Patent Number: 5,108,680
[45] Date of Patent: Apr. 28, 1992

[54] METHOD OF PRODUCING ADHESIVE RESIN PARTICLES

[75] Inventors: Karl-Hans Menting, Wunstorf; Hendrik Stevens, Hanover, both of Fed. Rep. of Germany

[73] Assignee: Continental Aktiengesellschaft, Hanover, Fed. Rep. of Germany

[21] Appl. No.: 725,975

[22] Filed: Jul. 5, 1991

[30] Foreign Application Priority Data

Dec. 17, 1988 [DE] Fed. Rep. of Germany ....... 3842613

[51] Int. Cl.⁵ ................................................ B29B 9/12
[52] U.S. Cl. .................................... 264/140; 264/144; 264/299
[58] Field of Search ............... 264/140, 144, 141, 241, 264/299, 7, 13

[56] References Cited

U.S. PATENT DOCUMENTS

| | | | |
|---|---|---|---|
| 2,556,247 | 6/1951 | Zeigler et al. | 264/144 |
| 3,491,177 | 1/1970 | Johnson | 264/144 |
| 3,669,722 | 6/1972 | Bishop | 264/144 |
| 3,927,166 | 12/1975 | Tomoda et al. | 264/144 |
| 4,081,502 | 3/1978 | Blumel et al. | 264/140 |
| 4,389,357 | 6/1983 | Chu et al. | 264/40.1 |
| 4,622,193 | 11/1986 | Kresge et al. | 264/141 |

FOREIGN PATENT DOCUMENTS

56-21841  2/1981  Japan.
2204825  11/1988  United Kingdom ............... 264/144

*Primary Examiner*—Mary Lynn Theisen
*Attorney, Agent, or Firm*—Robert W. Becker & Associates

[57] ABSTRACT

Adhesive resin particles of adhesive resin having a plasticizing range between 60° and 120° C., as well as a method of producing the particles. To prevent the particles from sticking together or caking during storage, they are in the form of coated particles, with at least one polyethylene hard wax having a solidification point of $\geq 90°$ C. being added to the adhesive resin to coat the same.

5 Claims, No Drawings

METHOD OF PRODUCING ADHESIVE RESIN PARTICLES

This is a divisional application of pending application Ser. No. 441,050 filed Nov. 22, 1989.

BACKGROUND OF THE INVENTION

The present invention relates to adhesive resin particles of adhesive resin having a softening or plasticizing range between 60 and 120° C., especially for the manufacture of rubber. The present invention also relates to a method of producing such particles.

The adhesive resin additives of rosin and tall oil resins are used during the manufacture of rubber. In this connection, the rosin is customarily delivered in metal drums, whereas tall oil resin is present in bags in the form of large pieces or clumps. When the drums are broken open, the drawback exists that metal particles can enter the rubber mixtures. However, the primary drawback with both rosin and tall oil resins is that both adhesive resins, as additives for a rubber mixture, can be weighed only by hand. Furthermore, it is already known to produce adhesive resins having higher plasticizing temperatures, for example phenol resins and hydrocarbon resins, in bead or tablet form.

With a view toward automating the production of rubber mixtures, it is desirable to have all of the adhesive resins present in such a form that they can be automatically weighed.

It is therefore an object of the present invention to provide adhesive resin particles that can be weighed automatically, and also to provide a method of producing the same.

SUMMARY OF THE INVENTION

Pursuant to the present invention, this object is realized in that the particles are in the form of coated particles, and in that added to the adhesive resin to coat the same is at least one polyethylene hard wax having a solidification point of $\geq 90°$ C. One method of producing such adhesive resin particles is characterized primarily by adding t molten adhesive resin, in an inert gas atmosphere, a polyethylene hard wax, conveying the thus-formed material to a bead or tablet-forming apparatus, and producing coated adhesive resin in tablet form with the tablet-forming apparatus, accompanied by cooling of the material comprised of adhesive resin and polyethylene hard wax.

The primary advantage of the inventive coating of the adhesive resin particles is that even after long storage periods of the particles, even during higher temperatures, such as in the summertime, the particles no longer adhere to one another or cake together, thus assuring an exact automatic weighing of the particle additives during the manufacture of a rubber mixture. Even where increased pressures are encountered due to the fact that the bags are stacked one above another on a plurality of pallets, no caking of the particles in the bottom bags occurs. In contrast with the state of the art, where the hard and brittle rosin produces dust problems and the danger of fire when it is broken up, the inventive coated rosin particles can be handled without difficulty in the plant. A further advantage of the present invention is that there no longer takes place a reduction in size or crushing of the rosin or tall oil resin accompanied by an increase in surface area and the thereby resulting oxidation, i.e. a reduction of the adhesive effect.

EXAMPLE

The following is one exemplary embodiment for explaining in detail the method of producing adhesive resin particles. First, rosin having a plasticizing range of between 60° and 120° C. is melted in an inert gas atmosphere, for example a nitrogen atmosphere, which prevents oxidation, at temperatures between 100° and 140° C. While stirring, polyethylene hard wax having a solidification point of $\geq 90°$ C. is subsequently added in an amount of about 2% by weight, with this polyethylene hard wax being dissolved in the molten material. Subsequently, the thus obtained material is conveyed to a bead or tablet-forming apparatus with which, accompanied by cooling, coated adhesive resin tablets are produced. By changing the pressure and viscosity, the desired size of the tablets can be set. In this connection, the viscosity of the molten material is controlled by the temperature. The particles of material are pressed through openings in the outer wall of the tablet-forming apparatus and fall onto a cooled stainless steel band, at the end of which coated adhesive resin tablets are present that have been cooled down to about 50° C. During the cooling process on the band, the polyethylene hard wax that is present in the material is deposited on the surface of the tablets, thus reliably preventing a later caking of the tablets. The tablets have a diameter of about 8 mm and a thickness of about 4 mm. With such small particles sizes, the rosin can be especially precisely automatically weight as an additive for a rubber mixture.

The described production method can analogously also be used for the production of adhesive resin particles on a tall oil resin base, of hydrocarbon resins (C5- or Cg base), and phenol resins, in each case with a plasticizing range between 60° and 120° C. The additives are linear or branched polyethylene hard waxes in an amount of from 0.5 to 6% by weight. The tabletizing is effected at temperatures of between 90° and 140° C. In order to assure an automated weighing with a weighing precision of only a few grams, the adhesive resin particles should have an average particle size of less than 15 mm.

Pursuant to a further inventive production method, the molten material comprised of the adhesive resin and the polyethylene hard wax that has been added thereto are poured onto a cooled metal band, resulting in a thin layer having a coated surface. By subsequently breaking up the material, adhesive resin particles in so-called flake form are obtained.

Tests have shown that the inventively produced coated adhesive resin particles show no sign of caking together even when stored for a long period of time under pressure and under temperatures of 50° C. Also when used to produce a rubber mixture, the inventive adhesive resin particles showed no drawbacks with regard to adhesion and vulcanisate characteristics.

The present invention is, of course, in no way ed to the specific disclosure of the specification and example, but also encompasses any modifications within the scope of the appended claims.

What we claim is:

1. A method of producing adhesive resin particles, including the steps of:
    adding to molten adhesive resin, in an inert gas atmosphere, a polyethylene hard wax;

mixing said molten adhesive resin and said polyethylene hard wax together to dissolve said wax in said molten resin;

conveying the thus-formed material mixture to a tablet-forming apparatus to form composed of adhesive resin and polyethylene hard wax; and producing coated adhesive resin in tablet form by cooling said tablets.

2. A method according to claim 1, which includes melting said adhesive resin and stirring in polyethylene hard wax in a nitrogen atmosphere.

3. A method according to claim 1, which includes the step of adding up to 2% by weight of polyethylene hard wax to molten adhesive resin selected from the group consisting of rosin and tall oil resin.

4. A method according to claim 1, in which said polyethylene hard wax has a solidification point of $\geqq 90°$ C.

5. A method of producing adhesive resin particles, including the steps of:

adding to molten adhesive resin, in an inert gas atmosphere, a polyethylene hard wax;

mixing said molten adhesive resin and said polyethylene hard wax together to dissolve said wax in said molten resin;

spreading the thus-formed material mixture onto a cooled metal band; and subsequently breaking up said material to produce flakes.

* * * * *

UNITED STATES PATENT AND TRADEMARK OFFICE
CERTIFICATE OF CORRECTION

PATENT NO. : 5,108,680
DATED : April 28, 1992
INVENTOR(S) : Karl-Hans Menting et al It is certified that error appears in the above-identified patent and that said Letters Patent is hereby corrected as shown below:

On the title page of the patent please insert the following:

Related U.S. Application Data
[62] Divisional of SN 441,050, November 22, 1989

Signed and Sealed this

Twenty-second Day of June, 1993

Attest:

MICHAEL K. KIRK

*Attesting Officer*   Acting Commissioner of Patents and Trademarks